United States Patent
Hayashi

(10) Patent No.: US 9,007,684 B2
(45) Date of Patent: Apr. 14, 2015

(54) MICROSCOPE AND MICROSCOPE LIGHT SOURCE UNIT

(71) Applicant: Olympus Corporation, Tokyo (JP)

(72) Inventor: Kazuhiro Hayashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 159 days.

(21) Appl. No.: 13/732,561

(22) Filed: Jan. 2, 2013

(65) Prior Publication Data

US 2013/0176618 A1    Jul. 11, 2013

(30) Foreign Application Priority Data

Jan. 11, 2012  (JP) ................................ 2012-003593

(51) Int. Cl.
| | |
|---|---|
| G02B 21/16 | (2006.01) |
| G02B 21/06 | (2006.01) |
| G02B 21/08 | (2006.01) |
| G02B 26/02 | (2006.01) |

(52) U.S. Cl.
CPC .............. *G02B 21/06* (2013.01); *G02B 21/088* (2013.01); *G02B 21/16* (2013.01); *G02B 26/023* (2013.01)

(58) Field of Classification Search
CPC .... G02B 21/00; G02B 21/06; G02B 21/0076; G02B 21/16
USPC ........................... 359/368, 381, 385, 388, 390
See application file for complete search history.

(56) References Cited

U.S. PATENT DOCUMENTS

| | | | |
|---|---|---|---|
| 2006/0119935 A1* | 6/2006 | Yamamoto | ..................... 359/368 |
| 2008/0094697 A1* | 4/2008 | Yamamoto | ..................... 359/391 |
| 2008/0310017 A1* | 12/2008 | Nolte et al. | ..................... 359/385 |

FOREIGN PATENT DOCUMENTS

| | | |
|---|---|---|
| JP | 2-140514 U | 11/1990 |
| JP | 2010-102095 A | 5/2010 |

* cited by examiner

*Primary Examiner* — Suchin Parihar
*Assistant Examiner* — William R Alexander
(74) *Attorney, Agent, or Firm* — Holtz, Holtz, Goodman & Chick PC

(57) ABSTRACT

A microscope includes: a first epi-illumination light-source unit to perform fluorescence observation; a second transmitted-illumination light-source unit to perform transmission observation, the second transmitted-illumination light-source unit including a light source provided with a light emitting element that emits excitation light and a fluorescent substance that emits fluorescence upon irradiation with the excitation light; and an incidence limiting section configured to limit an incidence of light on the light source from an outside of the second light source unit during a light-off period of the light emitting element. The incidence limiting section is configured to remove an incidence limitation of the light from the outside while the light emitting element is being lit.

16 Claims, 16 Drawing Sheets

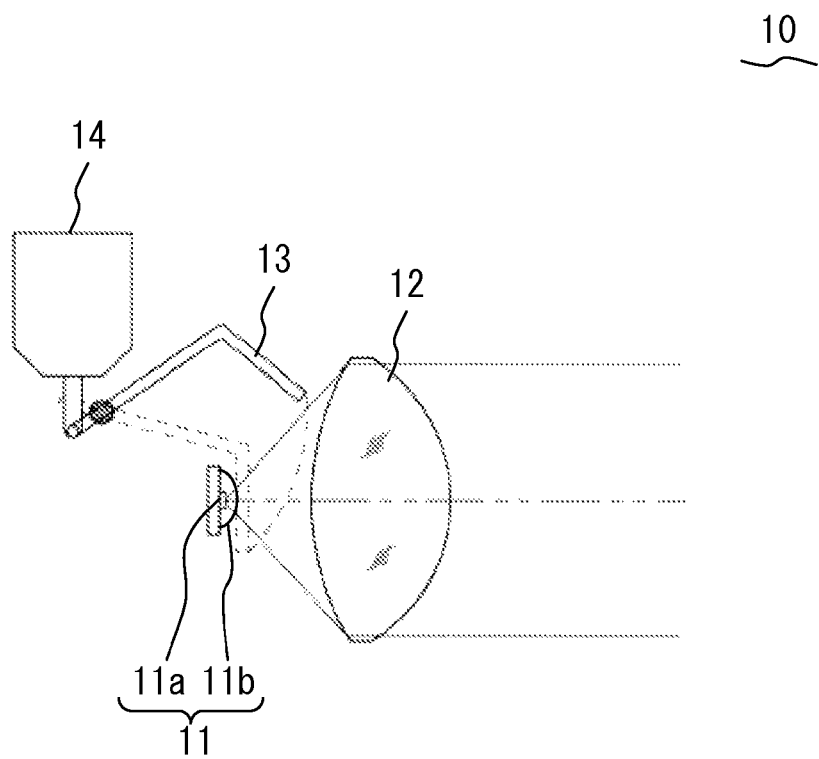
F I G. 2 B

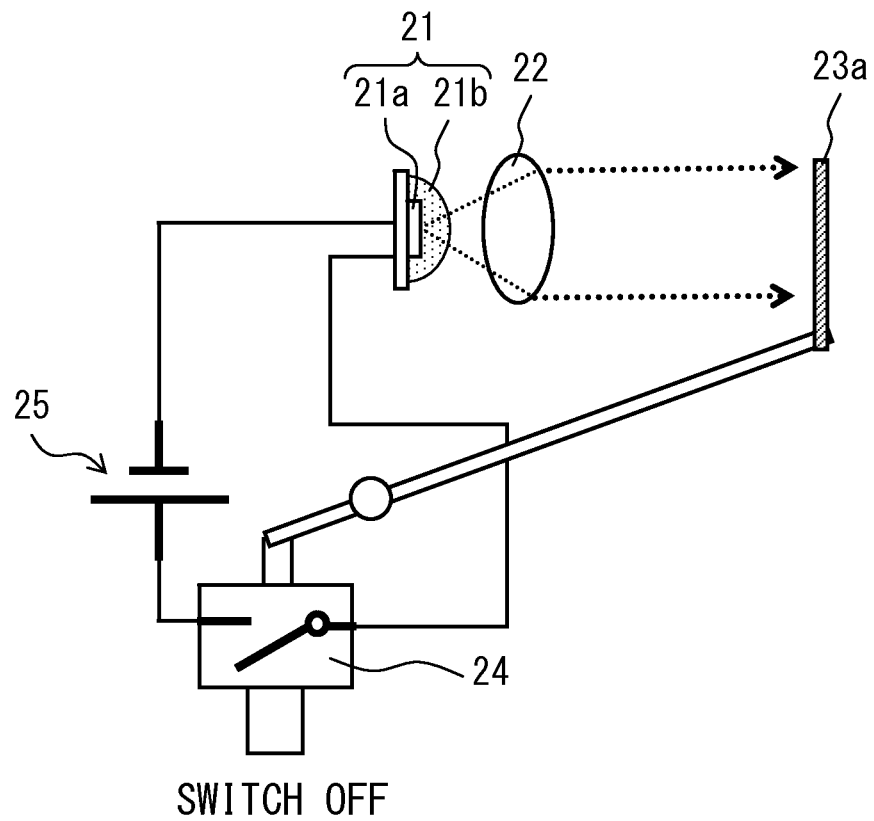
F I G. 3 C

SWITCH ON

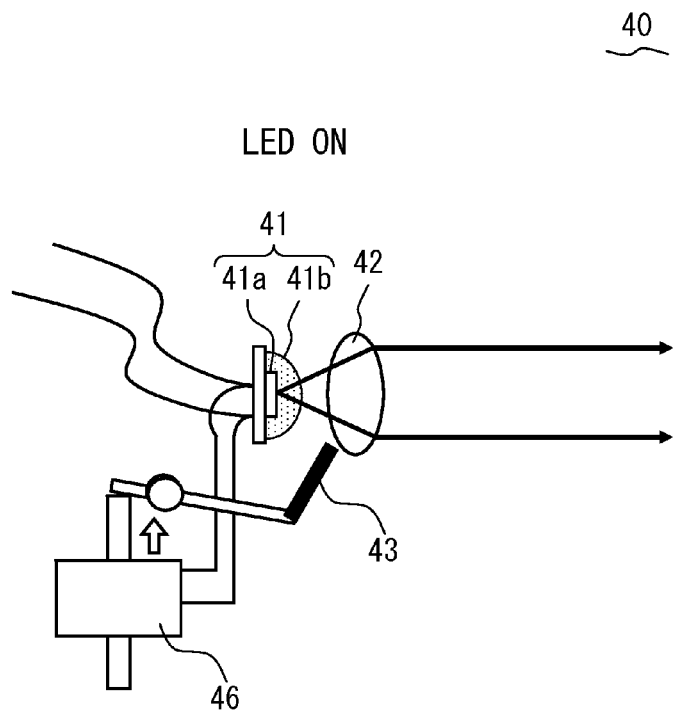
F I G. 5 B

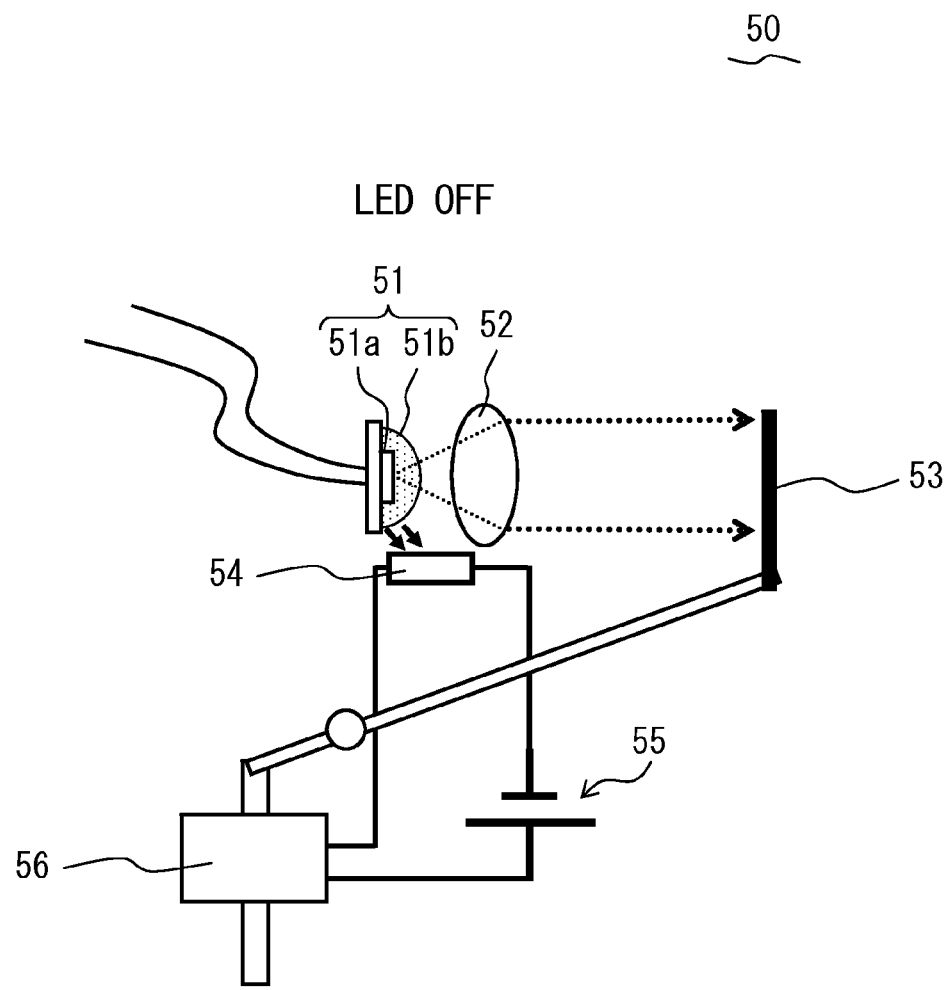
F I G. 6 A

MICROSCOPE AND MICROSCOPE LIGHT SOURCE UNIT

CROSS REFERENCE TO RELATED APPLICATIONS

This application is based upon and claims the benefit of priority from prior Japanese Patent Application No. 2012-003593, filed Jan. 11, 2012, the entire contents of which are incorporated herein by this reference.

BACKGROUND OF THE INVENTION

1. Field of the Invention

The present invention relates to a light source unit that mixes and emits excitation light from a light source and fluorescence generated by irradiating a fluorescent substance with excitation light; and a microscope including a light source unit that mixes and emits excitation light and fluorescence.

2. Description of the Related Art

In recent years, in accordance with improvements in luminous efficiency and luminance, microscopes provided with a transmitted illumination light-source unit that includes a white LED (light emitting diode) as a light source have often been seen. Some white LEDs use a system that uses LED chips of three colors, red, green and blue, and other white LEDs use a system that uses LED chips and fluorescent substances (hereinafter referred to as a "fluorescent substance system"), and, for example, Japanese Laid-open Patent Publication No. 2010-102095 discloses a microscope provided with a transmitted illumination light-source unit that uses as a light source a white LED adapted to the fluorescent substance system.

When a white LED adapted to the fluorescent substance system is used as a light source of a transmitted illumination light-source unit, light from the epi-illumination light-source unit that has passed through a sample may excite a fluorescent substance of the white LED while the sample is being observed via epi-illumination, thereby generating unnecessary fluorescence from the white LED.

A phenomenon such as this tends to occur particularly in a microscope provided with an epi-illumination light-source unit adapted to fluorescence observation, and, in fluorescence observation, fluorescence, which is typically an object to be detected, is weak, so the phenomenon greatly affects the observation result.

Technologies related to such a technical problem are disclosed by Japanese Laid-open Patent Publication No. 2010-102095 and Japanese Utility Model Application Publication No. 2-140514.

Japanese Laid-open Patent Publication No. 2010-102095 discloses a microscope system that includes: selecting means for selecting a transmitted illumination optical system or an epi-illumination optical system as an optical system for performing observation; and control means for, when the selected optical system is the epi-illumination optical system, controlling and causing light-shielding means to shield irradiation with epi-illumination light directed to a solid light-emitting element which is the light source of the transmitted illumination and to which a fluorescent substance is imparted.

Japanese Utility Model Application Publication No. 2-140514 discloses an epifluorescence microscope wherein an operator operates a dial so as to cause a shutter, light-shielding means, to be inserted into and withdrawn from a light path between a subject and a lens of a transmitted illumination system.

In the microscope system disclosed by Japanese Laid-open Patent Publication No. 2010-102095, when the epi-illumination optical system is selected, the control means controls turning-off of a solid light-emitting element, driving of the light-shielding means, and turning-on of an epi-illumination light source, and, as a result, the light-shielding means shields irradiation with epi-illumination light directed to the solid light-emitting element. Accordingly, users do not need to be conscious of operations of the light-shielding means and may cause the light-shielding means to act on irradiating of the solid light-emitting element with epi-illumination light without fail.

In the microscope system disclosed by Japanese Laid-open Patent Publication No. 2010-102095, the control means controls the light-shielding means by executing a control program using as an input a selection made by selecting means such as a mouse or a keyboard.

By contrast, in the epifluorescence microscope disclosed by Japanese Utility Model Application Publication No. 2-140514, a shutter is inserted in or withdrawn from a light source by operating a dial.

SUMMARY OF THE INVENTION

An aspect of the present invention provides a microscope including: a first epi-illumination light-source unit to perform fluorescence observation; a second transmitted-illumination light-source unit to perform transmission observation, the second transmitted-illumination light-source unit including a light source provided with a light emitting element that emits excitation light and a fluorescent substance that emits fluorescence upon irradiation with the excitation light; and an incidence limiting section to limit incidence of light on the light source from an outside of the second light source unit during a light-off period of the light emitting element, wherein the incidence limiting section is configured to remove an incidence limitation of the light from the outside while the light emitting element is being lit.

Another aspect of the present invention provides a microscope light-source unit including: a light source that includes a light emitting element that emits excitation light and a fluorescent substance that emits fluorescence upon irradiation with the excitation light; and an incidence limiting section to limit incidence of light on the light source from an outside during a light-off period of the light emitting element, wherein the incidence limiting section is configured to remove an incidence limitation of the light from the outside while the light emitting element is being lit.

BRIEF DESCRIPTION OF THE DRAWINGS

The present invention will be more apparent from the following detailed description when the accompanying drawings are referenced.

FIG. 2B illustrates a state of the transmitted-illumination light source unit of the microscope illustrated in FIG. 1A and FIG. 1B which is achieved during a light-on period of a light emitting element.

FIG. 3C illustrates a configuration of a modification of the light source unit illustrated in FIG. 3A and FIG. 3B.

FIG. 5B illustrates a configuration of a modification of the light source unit in accordance with embodiment 2 and illustrates a state which is achieved during a light-on period of a light emitting element.

FIG. 6A illustrates a configuration of a light source unit that includes a light emitting element and a fluorescent substance in accordance with embodiment 3 and illustrates a state which is achieved during a light-off period of the light emitting element.

DESCRIPTION OF THE EMBODIMENTS

Figure 1A:
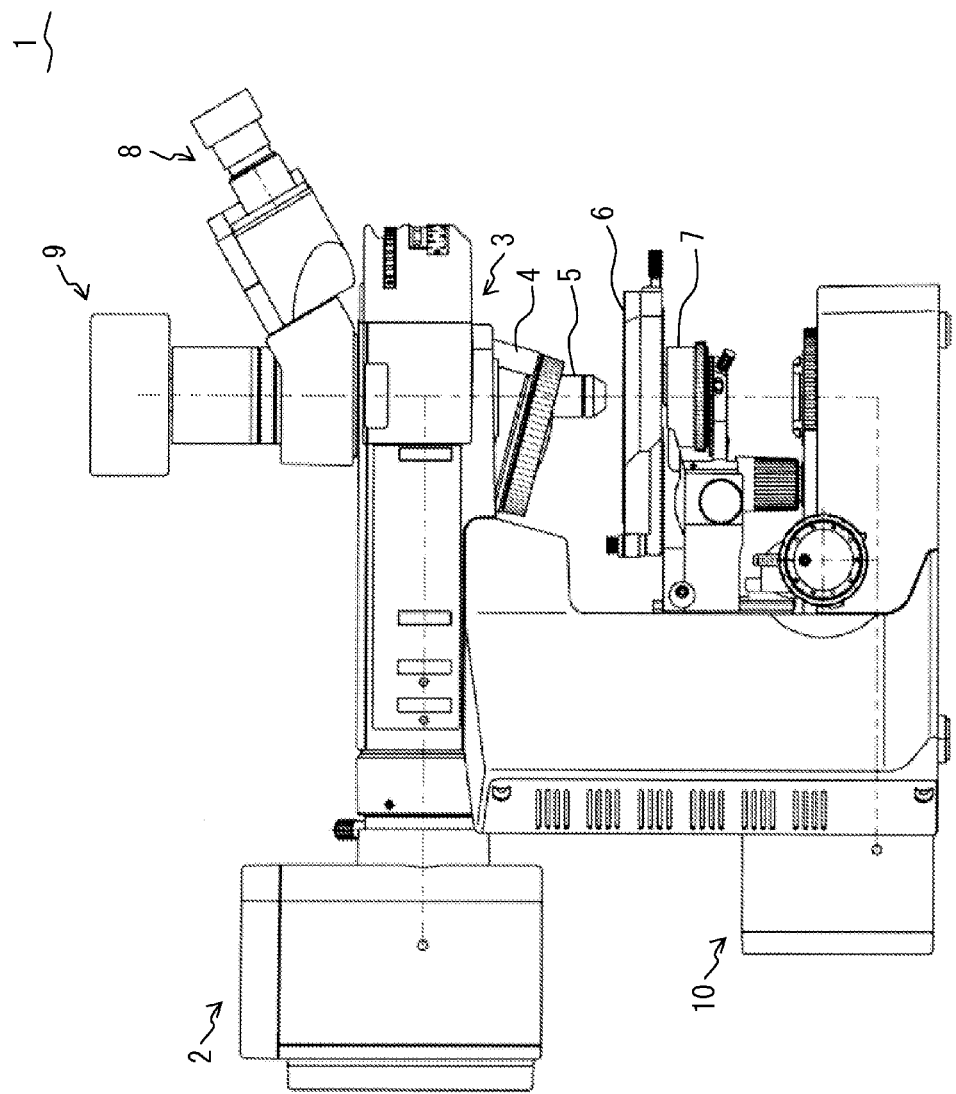
FIG. 1A is a side view of a microscope in accordance with an embodiment of the present invention.
Figure 1B:
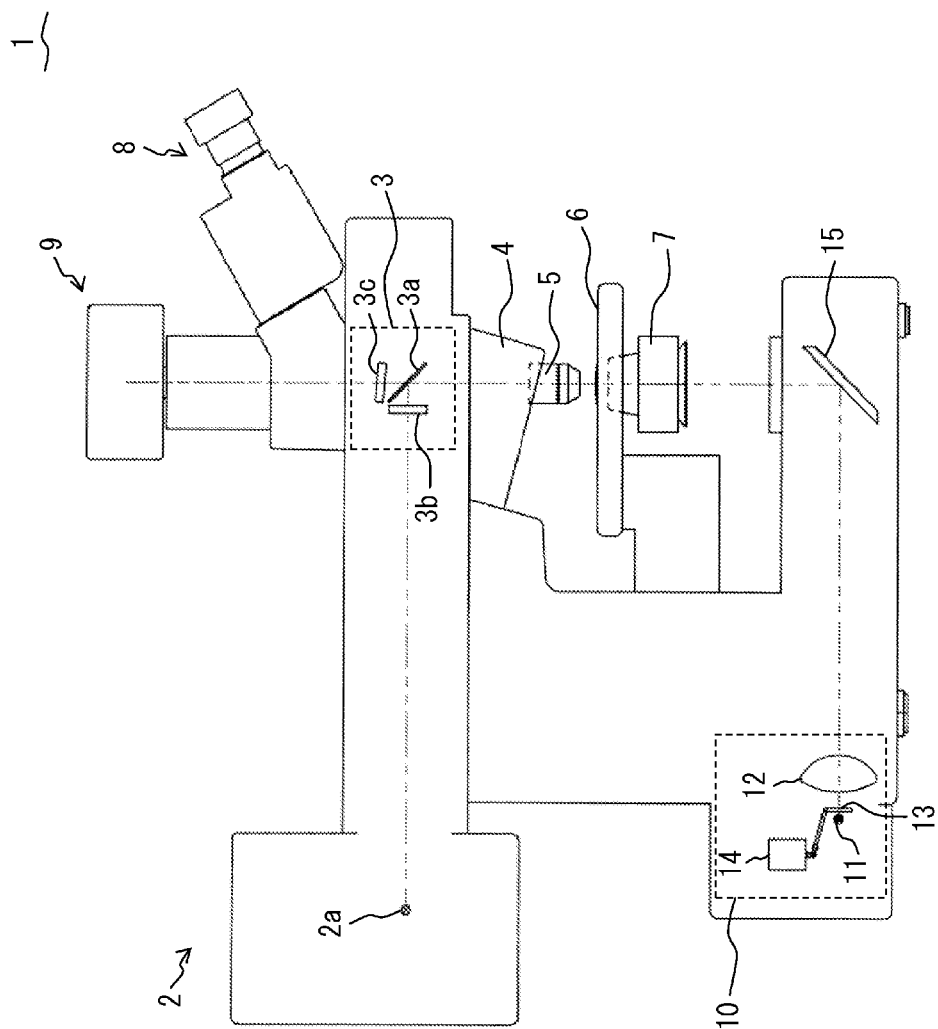
FIG. 1B is a cross-sectional view of a microscope in accordance with an embodiment of the present invention.
Figure 2A:
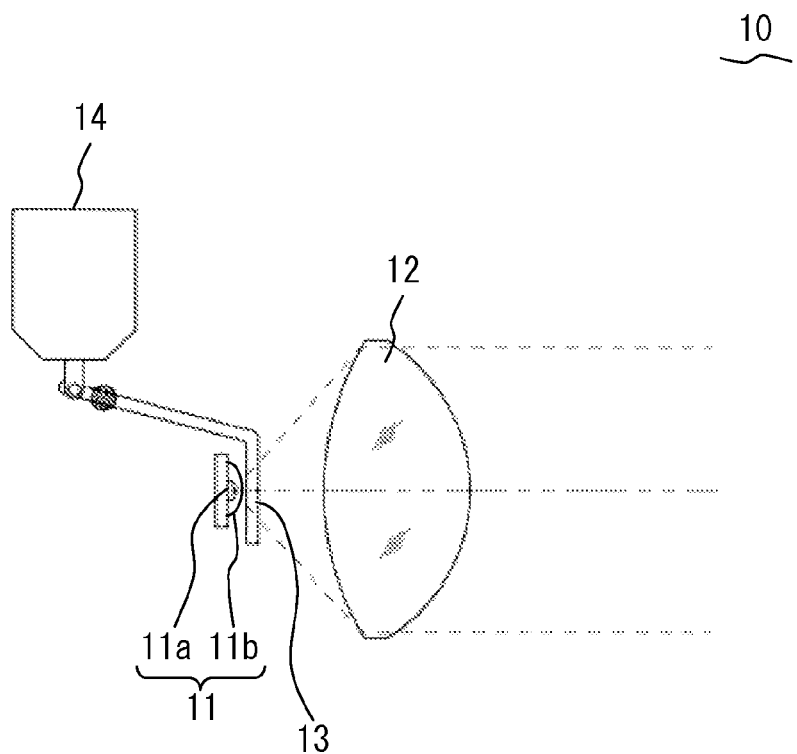
FIG. 2A illustrates a state of a transmitted-illumination light source unit of the microscope illustrated in FIG. 1A and FIG. 1B which is achieved during a light-off period of a light emitting element.

First, before embodiments are described, an outline of a basic configuration and operation of a microscope in accordance with an embodiment of the present invention will be described with reference to FIG. 1A to FIG. 2B. FIG. 1A and FIG. 1B illustrate a side view and a cross-sectional view of a microscope in accordance with an embodiment of the present invention. FIG. 2A and FIG. 2B illustrate states of a transmitted-illumination light source unit of the microscope illustrated in FIG. 1A and FIG. 1B and respectively illustrate states which are achieved during a light-off period and a light-on period of a light emitting element.

A microscope 1 illustrated in FIG. 1A is a fluorescence microscope that includes an epi-illumination light source unit (a first light source unit) to perform fluorescence observation and a transmitted-illumination light source unit 10 (a second light source unit) to perform transmission observation. The microscope 1 further includes: a mirror unit 3 that separates an illumination light path and an observation light path; a revolver 4; an objective 5 attached to the revolver 4; a stage 6 on which a sample (not illustrated) is placed; a condenser lens 7 that faces and is separated from the objective 5 by the sample; an eyepiece unit 8 to enable visual observation of the sample; and an image pickup unit 9 to pick up an image of the sample.

As illustrated in FIG. 1B, the mirror unit 3 is, for example, a fluorescent mirror unit composed of a dichroic mirror 3a, an excitation filter 3b, and a barrier filter 3c, and the mirror unit 3 may be replaced with another mirror unit if necessary.

As illustrated in FIG. 1B, the light source unit 10 includes: a light source 11; a collector lens 12 that converts light from the light source 11 into substantially parallel light; a shading member 13 that is an incidence limiting section to limit incidence of light on the light source 11 from an outside of the light source unit 10; and a button switch 14 connected to the shading member 13.

As illustrated in FIG. 2A and FIG. 2B, the light source 11 includes a solid light-emitting element 11a that emits excitation light and a fluorescent substance 11b that emits fluorescence upon irradiation with the excitation light, and the solid light-emitting element 11a is sealed by, for example, resin that contains the fluorescent substance 11b. Accordingly, when the solid light-emitting element 11a emits excitation light, mixed light, which is a mixture of the excitation light and fluorescence generated from the fluorescent substance 11b, is emitted from the light source 11. The light source 11 is, for example, a white LED, and the solid light-emitting element 11a is, for example, a single-color LED chip. The brightness of the light source 11 may be properly adjusted by controlling a voltage or a current or by combining filters having different transmittances (not illustrated).

As illustrated in FIG. 1B, the shading member 13 is capable of being inserted in and withdrawn from a transmitted-illumination light path between the light source 11 and the collector lens 12, and the shading member 13 is inserted in and withdrawn from the transmitted-illumination light path, which is an outgoing light path of mixed light, in conjunction with the button switch 14, which is used to switch a state of the solid light-emitting element 11a between a light-on state and a light-off state. That is, in conjunction with an operation of the button switch 14, the shading member 13 removes or starts an incidence limitation of light from outside.

More particularly, when the button switch 14 is put in an ON state, the solid light-emitting element 11a is switched to the light-on state and the shading member 13 is removed from the light path, thereby leaving the transmitted-illumination light path open. That is, when the solid light-emitting element 11a is turned on, the shading member 13 removes the incidence limitation of light from outside of the light source unit 10. When the button switch 14 is put in an OFF state, the solid light-emitting element 11a is switched to the light-off state and the shading member 13 is inserted in the light path, thereby blocking the transmitted-illumination light path. That is, when the solid light-emitting element 11a is turned off, the shading member 13 starts the incidence limitation of light from outside of the light source unit 10.

As a result, only during a period in which transmission observation is performed, i.e., a light-on period of the solid light-emitting element 11a, is the shading member 13 located as illustrated in FIG. 2B at a position that deviates from the transmitted-illumination light path between the light source 11 and the collector lens 12. During the other periods (including a period in which fluorescence observation is performed via epi-illumination), i.e., a light-off period of the solid light-emitting element 11a, the shading member 13 is placed on the transmitted-illumination light path as illustrated in FIG. 2A, thereby limiting light incidence from outside.

For the microscope 1 and the light source unit 10 configured as described above, by simply performing operations typically performed when the light source unit 10 is used (an operation for turning light on and an operation for turning light off, both of which are performed using the button switch 14), incidence of unnecessary light on the light source 11 may be limited during the light-off period of the light source unit 10 and mixed light from the light source 11 may be emitted to outside during the light-on period without being conscious of operations of the shading member 13.

For the microscope 1 and the light source unit 10, operations for inserting and withdrawing the shading member 13 do not depend on a state outside of the light source unit 10. As a result, the microscope 1 and the light source unit 10 do not need to recognize a state outside of the light source unit 10 and do not need a section to recognize or control a state outside of the light source unit 10.

Accordingly, without complicating the configuration of the microscope, the microscope 1 and the light source unit 10 enable an incidence of unnecessary light on a light source that includes a solid light-emitting element and a fluorescent substance to be easily limited. As a result, generation of fluorescence from a fluorescent substance may be suppressed to avoid the influence of the fluorescence on a fluorescence image obtained in fluorescence observation.

Next, embodiments will be described in detail.
<Embodiment 1>

Figure 3A:
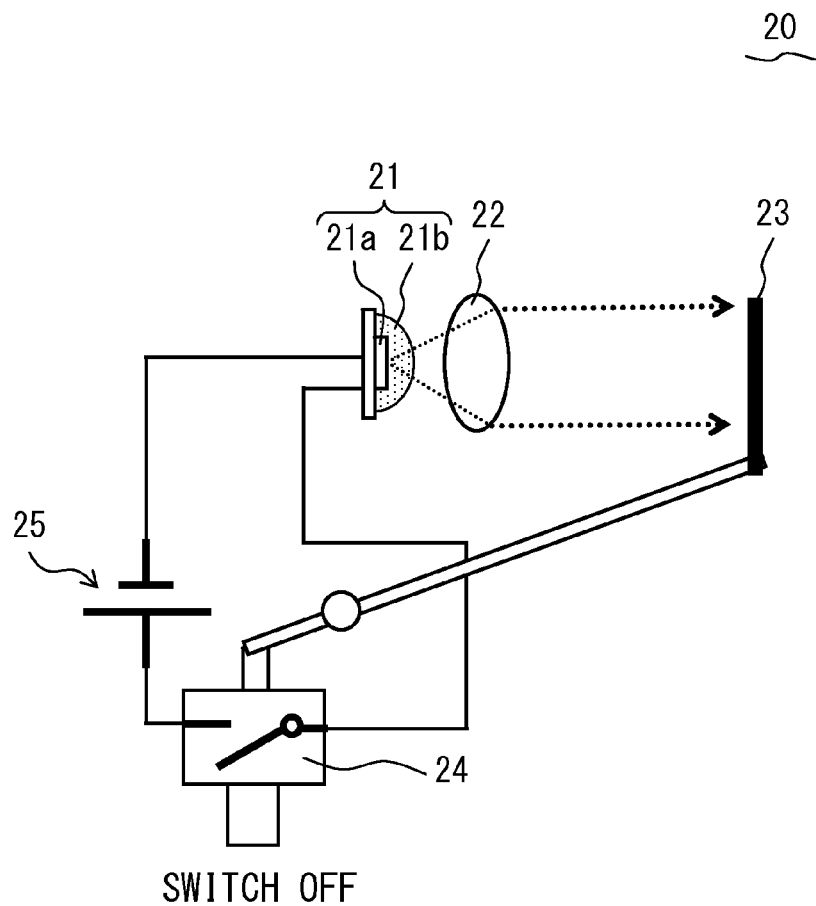
FIG. 3A illustrates a configuration of a light source unit that includes a light emitting element and a fluorescent substance in accordance with embodiment 1 and illustrates a state which is achieved during a light-off period of the light emitting element.
Figure 3B:
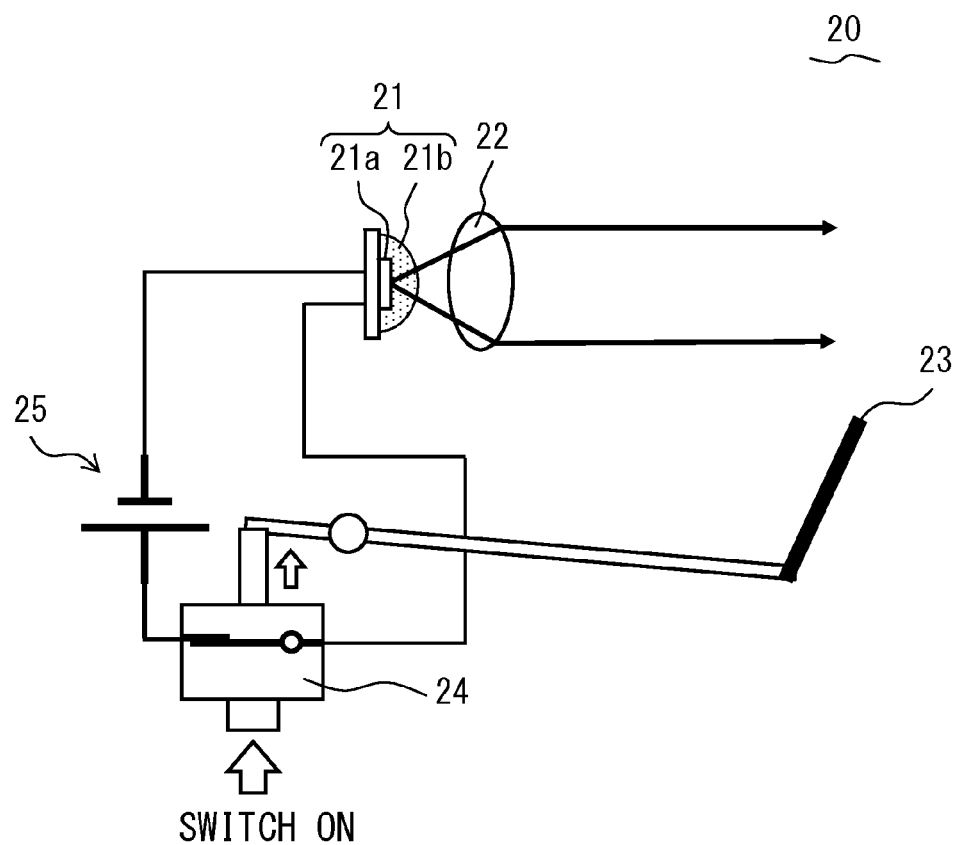
FIG. 3B illustrates a configuration of the light source unit that includes the light emitting element and the fluorescent substance in accordance with embodiment 1 and illustrates a state which is achieved during a light-on period of the light emitting element.

FIG. 3A illustrates a configuration of a light source unit that includes a light emitting element and a fluorescent substance in accordance with the present embodiment and illustrates a state which is achieved during a light-off period of the light emitting element. FIG. 3B illustrates the configuration of the light source unit that includes the light emitting element and the fluorescent substance in accordance with the present embodiment and illustrates a state which is achieved during a light-on period of the light emitting element. Except for the fact that the microscope in accordance with the present embodiment includes a light source unit 20 illustrated in FIG. 3A and FIG. 3B instead of the light source unit 10, the microscope in accordance with the present embodiment is similar to the microscope 1 illustrated in FIG. 1A and FIG. 1B. Accordingly, descriptions will not be given in detail.

The light source unit 20 illustrated in FIG. 3A and FIG. 3B is a microscope light source unit, and the light source unit 20 includes: a light source 21 that includes a solid light-emitting element 21a which emits excitation light and a fluorescent substance 21b which emits fluorescence upon irradiation with the excitation light; a collector lens 22 that converts, into substantially parallel light, mixed light which is a mixture of excitation light and fluorescence emitted from the light source 21; a shading member 23 that is an incidence limiting section to limit incidence of light on the light source 21 from an outside of the light source unit 20; a button switch 24 to switch a state of the solid light-emitting element 21a between a light-on state and a light-off state; and a power supply 25 that supplies electric power to the light source 21. As illustrated in FIG. 3B, when the button switch 24 is put in an ON state, electric power is supplied from the power supply 25 to the light source 21, so the solid light-emitting element 21a is put in the light-on state and emits excitation light, which excites and causes the fluorescent substance 21b to emit fluorescence. As a result, mixed light, which is a mixture of excitation light and fluorescence, is emitted from the light source 21. At the same time, through mechanical driving via pressing of the button switch 24, the shading member 23 is located at a position that deviates from an outgoing light path of the mixed light. That is, the shading member 23 is configured to remove an incidence limitation of light from outside in conjunction with an energizing of the solid light-emitting element 21a while the solid light-emitting element 21a is in the light-on state.

As illustrated in FIG. 3A, when the button switch 24 is put in an OFF state, electric power from the power supply 25 to the light source 21 stops, so the solid light-emitting element 21a is put in the light-off state and emission of mixed light from the light source 21 also stops. At the same time, through mechanical driving via pressing of the button switch 24, the shading member 23 is located on the outgoing light path of the mixed light. That is, the shading member 23 is configured to start an incidence limitation of light from outside while the solid light-emitting element 21a is in the light-off state.

Accordingly, as with the light source unit 10 and the microscope 1, without complicating the configuration of the microscope, the light source unit 20 and a microscope that includes the light source unit 20 enable incidence of unnecessary light on a light source that includes a solid light-emitting element and a fluorescent substance to be easily limited. As a result, generation of fluorescence from a fluorescent substance may be suppressed to avoid the influence of the fluorescence on a fluorescence image obtained in fluorescence observation.

Figure 3D:
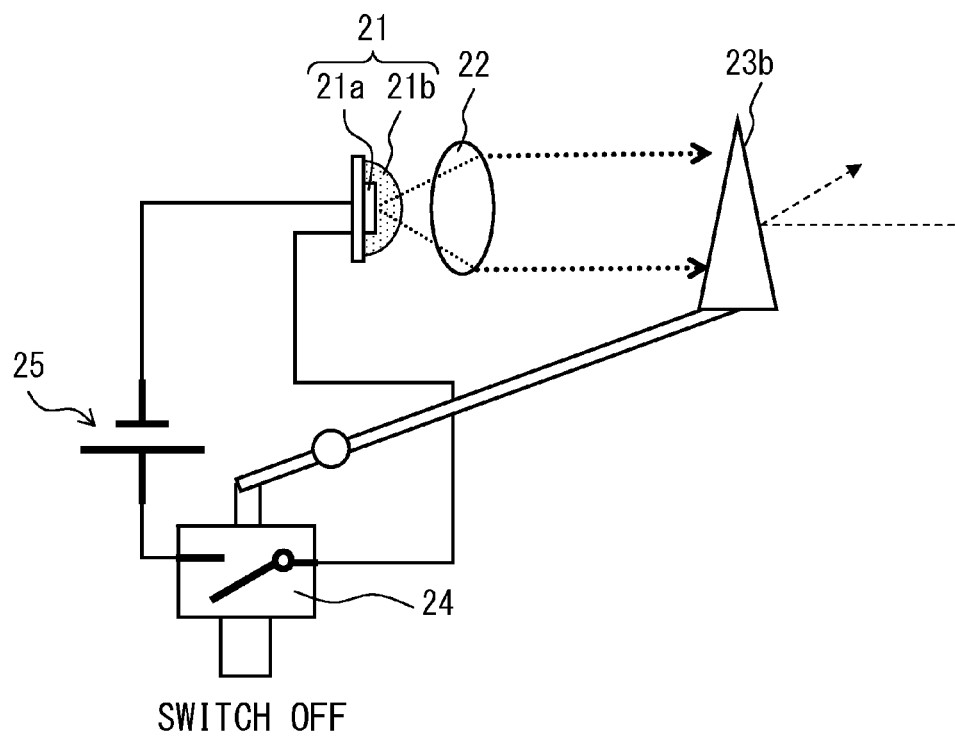
FIG. 3D illustrates a configuration of another modification of the light source unit illustrated in FIG. 3A and FIG. 3B.

Although FIG. 3A and FIG. 3B illustrate the shading member 23 as an incidence limiting section to limit an incidence of light on a light source from an outside of a light source unit, the incidence limiting section is not limited to the shading member 23. As an example, instead of the shading member 23 which is inserted in or withdrawn from a light path, another shutter structure such as a blade diaphragm may be used as an incidence limiting section. Meanwhile, instead of the shading member 23, as illustrated in FIG. 3C, a dim member 23a may be used which is capable of being inserted in and withdrawn from the outgoing light path of mixed light and which dims light from an outside of the light source unit, and the dim section 23a may weaken light intensity to the extent that generation of fluorescence can be suppressed. Moreover, instead of the shading member 23, as illustrated in FIG. 3D, a light path switching section 23b that is located on the outgoing light path of mixed light and that switches a light path of light from an outside of the light source unit may be used as an incidence limiting section. The light path switching section may be configured to retract the light source itself from the optical path of light from an outside of the light source unit. That is, the light path switching section may be configured to lead light from outside in a direction that deviates from the light source during the light-off period of the light emitting element.

In FIG. 3A and FIG. 3B, the shading member 23, which is an incidence limiting section to limit an incidence of light on the light source from an outside of the light source unit, is provided within the light source unit, but as long as the incidence limiting section is operated in conjunction with an operation of the button switch 24, the incidence limiting section may be provided outside the light source unit. As an example, the incidence limiting section may be inserted in and withdrawn from a light path between the stage 6 and the condenser lens 7. In particular, the shading member 23 is desirably located at a position at which the diameter of a light flux becomes small so that the size of the shading member 23 itself can be decreased and the amount of movement of the shading member 23 can become small in the inserting of the shading member 23 in the light path or in the withdrawing of the shading member 23 from the light path.

<Embodiment 2>

Figure 4A:
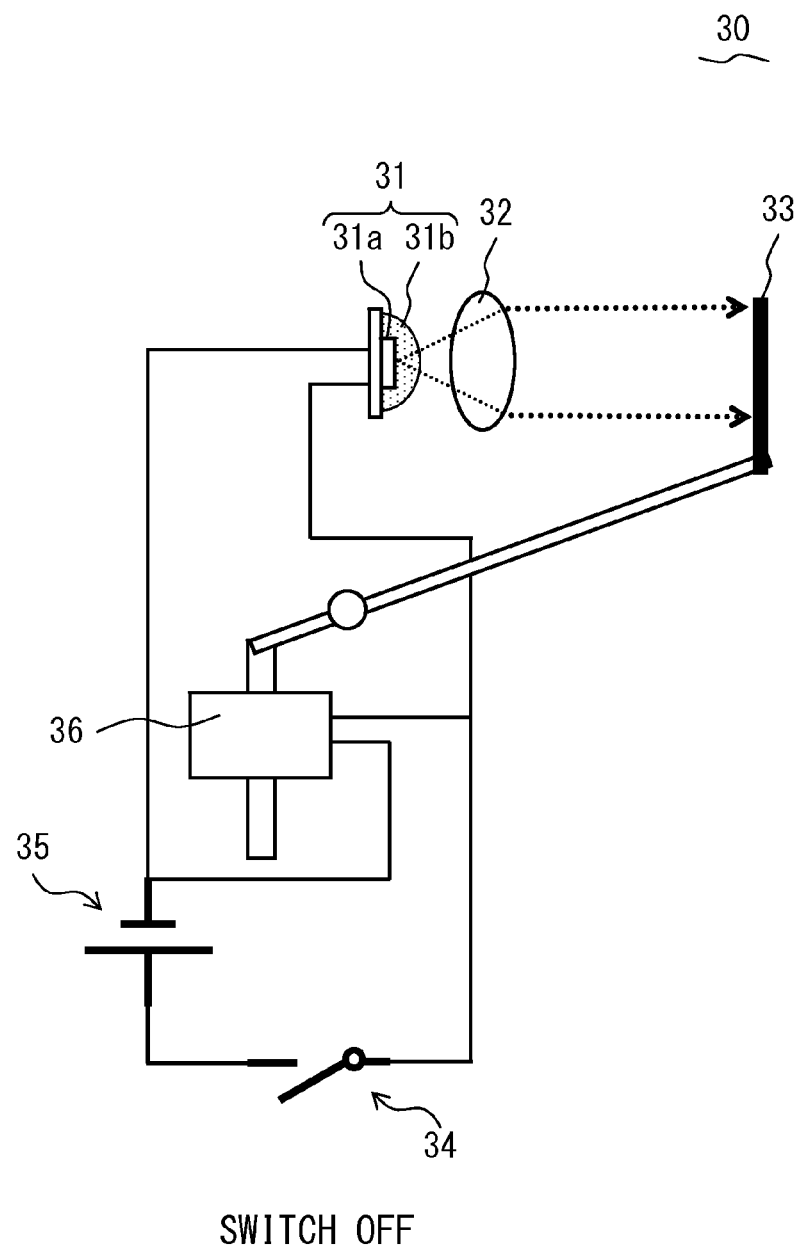
FIG. 4A illustrates a configuration of a light source unit that includes a light emitting element and a fluorescent substance in accordance with embodiment 2 and illustrates a state which is achieved during a light-off period of the light emitting element.
Figure 4B:
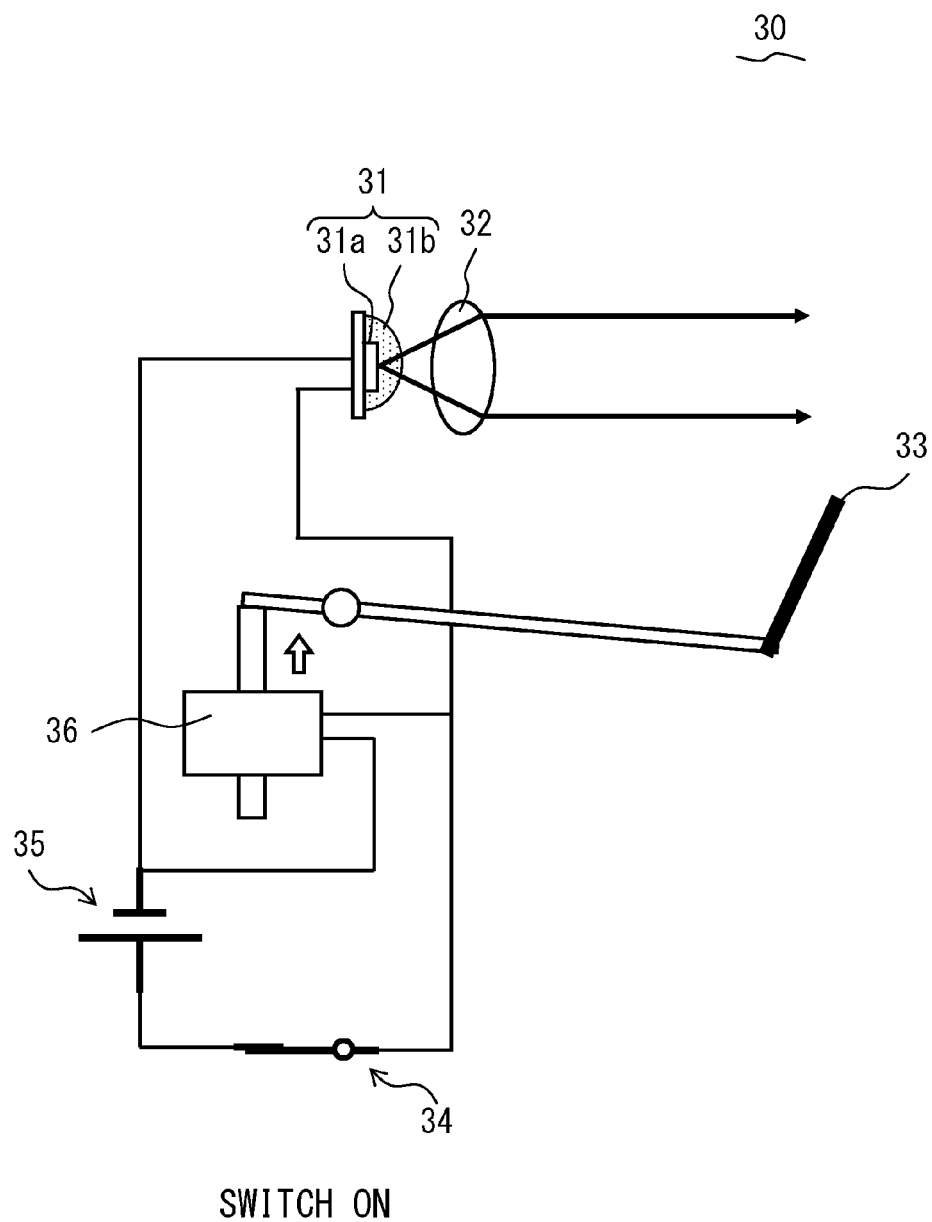
FIG. 4B illustrates the configuration of the light source unit that includes the light emitting element and the fluorescent substance in accordance with embodiment 2 and illustrates a state which is achieved during a light-on period of the light emitting element.

FIG. 4A illustrates a configuration of a light source unit that includes a light emitting element and a fluorescent substance in accordance with the present embodiment and illustrates a state which is achieved during a light-off period of the light emitting element. FIG. 4B illustrates the configuration of the light source unit that includes the light emitting element and the fluorescent substance in accordance with the present embodiment and illustrates a state which is achieved during a light-on period of the light emitting element. Except for the fact that the microscope in accordance with the present embodiment includes a light source unit 30 illustrated in FIG. 4A and FIG. 4B instead of the light source unit 10, the microscope in accordance with the present embodiment is similar to the microscope 1 illustrated in FIG. 1A and FIG. 1B. Accordingly, descriptions will not be given in detail.

The light source unit 30 illustrated in FIG. 4A and FIG. 4B is a microscope light source unit, and the light source unit 30 includes: a light source 31 that includes a solid light-emitting element 31a which emits excitation light and a fluorescent substance 31b which emits fluorescence upon irradiation with the excitation light; a collector lens 32 that converts, into substantially parallel light, mixed light which is a mixture of excitation light and fluorescence emitted from the light source 31; a shading member 33 that is an incidence limiting section to limit incidence of light on the light source 31 from an outside of the light source unit 30; a switch 34 to switch a state of the solid light-emitting element 31a between a light-on state and a light-off state; and a power supply 35 to supply electric power to the light source 31 and an actuator 36; and a solenoid actuator 36 that converts electric power into mechanical drive.

Unlike the button switch 24 in accordance with embodiment 1, the switch 34 is not physically pressed to switch between the ON state and the OFF state but is externally controlled to electrically switch between the ON state and the OFF state.

When the switch 34 is put in an ON state, electric power is supplied from the power supply 35 to the light source 31, so the solid light-emitting element 31a is put in the light-on state and emits excitation light, which excites and causes the fluorescent substance 31b to emit fluorescence. As a result, mixed light which is a mixture of excitation light and fluorescence is emitted from the light source 31. At the same time, through mechanical driving of the actuator 36 to which electric power has been supplied by the power supply 35, the shading member 33 is located at a position that deviates from an outgoing light path of the mixed light. That is, the shading member 33 is configured to remove an incidence limitation of light from outside in conjunction with energizing of the solid light-emitting element 31a while the solid light-emitting element 31a is in the light-on state.

When the switch 34 is put in an OFF state, electric power from the power supply 35 to the light source 31 stops, so the solid light-emitting element 31a is put in the light-off state and emission of mixed light from the light source 31 also stops. At the same time, supply of electric power from the power supply 35 to the actuator 36 stops, so mechanical driving caused by a restoring force of, for example, a spring (not illustrated) included in the actuator 36 places the shading member 33 on the outgoing light path of mixed light. That is, the shading member 33 is configured to start an incidence limitation of light from outside while the solid light-emitting element 31a is in the light-off state.

Accordingly, as with the light source unit 10 and the microscope 1, without complicating the configuration of the microscope, the light source unit 30 and a microscope that includes the light source unit 30 enable incidence of unnecessary light on a light source that includes a solid light-emitting element and a fluorescent substance to be easily limited. As a result, generation of fluorescence from a fluorescent substance may be suppressed to avoid the influence of the fluorescence on a fluorescence image obtained in fluorescence observation.

Figure 5A:
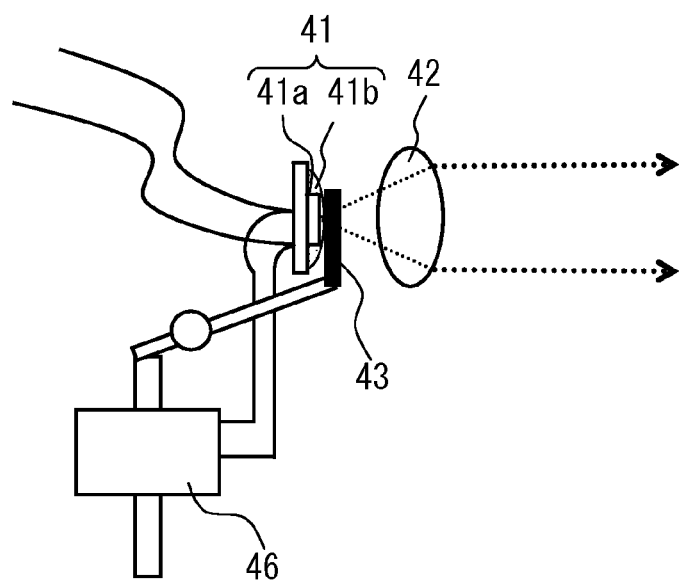
FIG. 5A illustrates a configuration of a modification of the light source unit in accordance with embodiment 2 and illustrates a state which is achieved during a light-off period of a light emitting element.

FIG. 4A and FIG. 4B illustrate a configuration in which electric power is supplied from the power supply 35 to both the solid light-emitting element 31a and the actuator 36, but the connection configuration is not particularly limited to this configuration. As an example, as illustrated in FIG. 5A and FIG. 5B, electric power may be supplied from a power supply (not illustrated) directly to a solid light-emitting element 41a and electric power may be supplied from the power supply via the solid light-emitting element 41a to an actuator 46. As long as the actuator is operated in conjunction with energization of the solid light-emitting element via a switch operation, any connection configurations may be employed.

As with the light source unit 20 in accordance with embodiment 1 and the microscope that includes the light source unit 20, the light source unit 30 in accordance with the present embodiment and the microscope that includes the light source unit 30 may be modified variously.

<Embodiment 3>

Figure 6B:
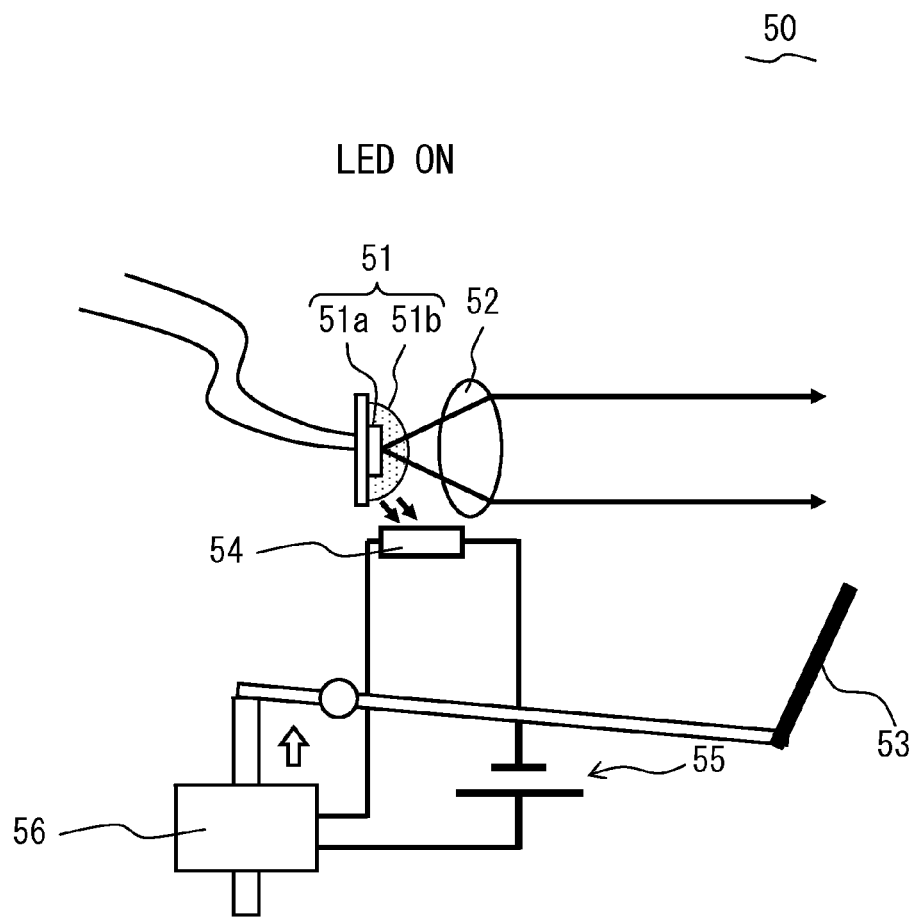
FIG. 6B illustrates the configuration of the light source unit that includes the light emitting element and the fluorescent substance in accordance with embodiment 3 and illustrates a state which is achieved during a light-on period of the light emitting element.

FIG. 6A illustrates a configuration of a light source unit that includes a light emitting element and a fluorescent substance in accordance with the present embodiment and illustrates a state which is achieved during a light-off period of the light emitting element. FIG. 6B illustrates the configuration of the light source unit that includes the light emitting element and the fluorescent substance in accordance with the present embodiment and illustrates a state which is achieved during a light-on period of the light emitting element. Except for the fact that the microscope in accordance with the present embodiment includes a light source unit 50 illustrated in FIG. 6A and FIG. 6B instead of the light source unit 10, the microscope in accordance with the present embodiment is similar to the microscope 1 illustrated in FIG. 1A and FIG. 1B. Accordingly, descriptions will not be given in detail.

The light source unit 50 illustrated in FIG. 6A and FIG. 6B is a microscope light source unit, and the light source unit 50 includes: a light source 51 that includes a solid light-emitting element 51a which emits excitation light and a fluorescent substance 51b which emits fluorescence upon irradiation with the excitation light; a collector lens 52 that converts, into substantially parallel light, mixed light which is a mixture of excitation light and fluorescence emitted from the light source 51; a shading member 53 that is an incidence limiting section to limit light incident on the light source 51 from an outside of the light source unit 50; a photoconduction cell 54 having resistance that is variable upon irradiation with light; a power supply 55 that supplies electric power to an actuator 56; and a solenoid actuator 56 that converts electric power into mechanical drive.

While the solid light-emitting element 51a is in the light-on state, the resistance of the photoconduction cell 54 decreases, causing a current to pass through the photoconduction cell 54; while the solid light-emitting element 51a is in the light-off state, the resistance of the photoconduction cell 54 increases, so a current does not pass through the photoconduction cell 54. Using such a characteristic, the photoconduction cell 54 functions as a switch that switches the state between the ON state and the OFF state in accordance with the state of the solid light-emitting element 51a (the light-on state and the light-off state).

Although not illustrated, the light source unit 50 further includes a switch that corresponds to the button switch 24 of the light source unit 20 in accordance with embodiment 1 and that switches the state of the solid light-emitting element 51a between the light-on state and the light-off state.

When the switch (not illustrated) is put in an ON state, the solid light-emitting element 51a is put in the light-on state and emits excitation light, which excites and causes the fluorescent substance 51b to emit fluorescence. As a result, mixed light which is a mixture of excitation light and fluorescence is emitted from the light source 51. At the same time, the resistance of the photoconduction cell 54 is decreased via irradiation with light from the light source 51, causing the power supply 55 to supply electric power to the actuator 56, with the result that, through mechanical driving of the actuator 56, the shading member 53 is located at a position that deviates from an outgoing light path of the mixed light. That is, the shading member 53 is configured to remove an incidence limitation of light from outside while the solid light-emitting element 51a is being lit in conjunction with light emission of the solid light-emitting element 51a.

When the switch (not illustrated) is put in the OFF state, the solid light-emitting element 51a is put in the light-on state. At the same time, the resistance of the photoconduction cell 54 increases, thereby stopping the supply of electric power from the power supply 55 to the actuator 56. As a result, mechanical driving caused by a restoring force of, for example, a spring (not illustrated) included in the actuator 56 places the shading member 53 on the outgoing light path of mixed light. That is, the shading member 53 is configured to start an incidence limitation of light from outside while the solid light-emitting element 51a is in the light-off state.

Accordingly, as with the light source unit 10 and the microscope 1, without complicating the configuration of the microscope, the light source unit 50 and a microscope that includes the light source unit 50 enable incidence of unnecessary light on a light source that includes a solid light-emitting element and a fluorescent substance to be easily limited. As a result, generation of fluorescence from a fluorescent substance may be suppressed to avoid the influence of the fluorescence on a fluorescence image obtained in fluorescence observation.

FIG. 6A and FIG. 6B illustrate the photoconduction cell 54 that conducts electricity via the resistance being decreased upon irradiation with light and that stops a flow of electricity via the resistance being increased upon stopping of irradiation with light, but the photoconduction cell is not particularly limited to one having such a characteristic. The photoconduction cell only needs to function as a switch that switches the state between the ON state and the OFF state in accordance with the state of the solid light-emitting element 51a (the light-on state and the light-off state); as an example, the photoconduction cell may stop a flow of electricity via the resistance being increased upon irradiation with light and may conduct electricity via the resistance being decreased upon stopping of irradiation with light. As with the light source unit 20 in accordance with embodiment 1 and the microscope that includes the light source unit 20, the light source unit 50 in accordance with the present embodiment and the microscope that includes the light source unit 50 may be modified variously.

<Embodiment 4>

Figure 7A:
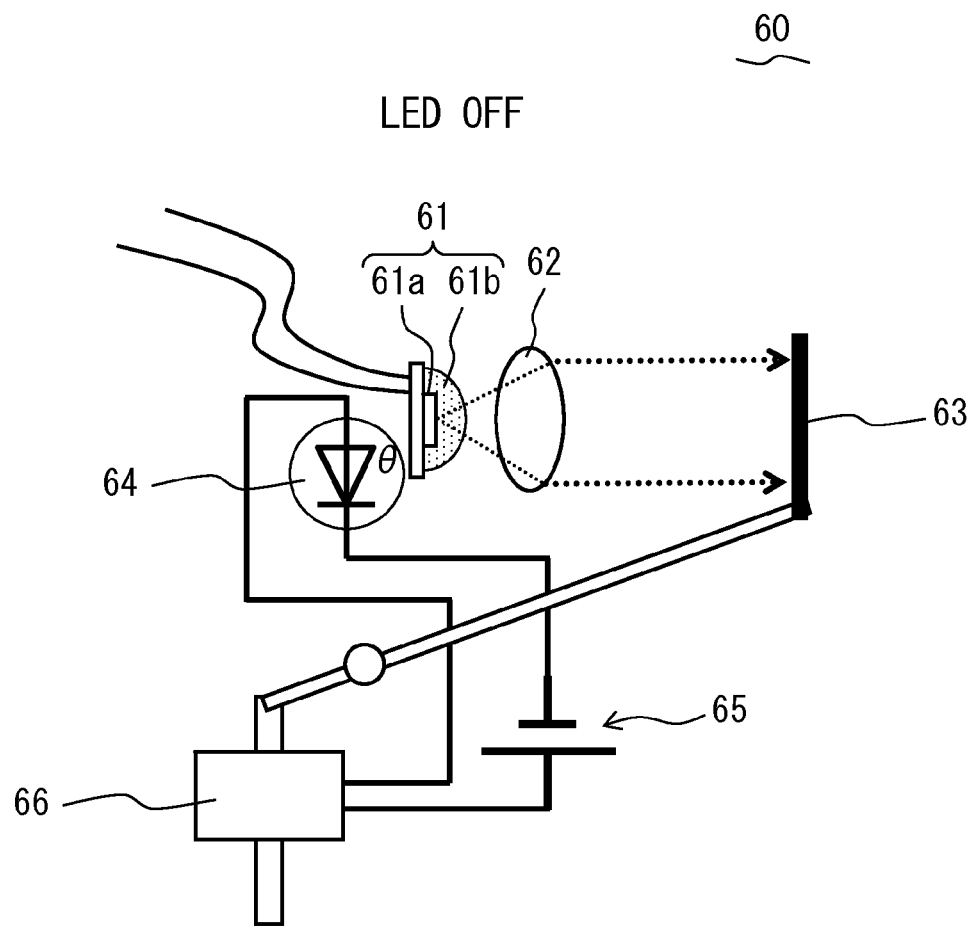
FIG. 7A illustrates a configuration of a light source unit that includes a light emitting element and a fluorescent substance in accordance with embodiment 4 and illustrates a state which is achieved during a light-off period of the light emitting element.
Figure 7B:
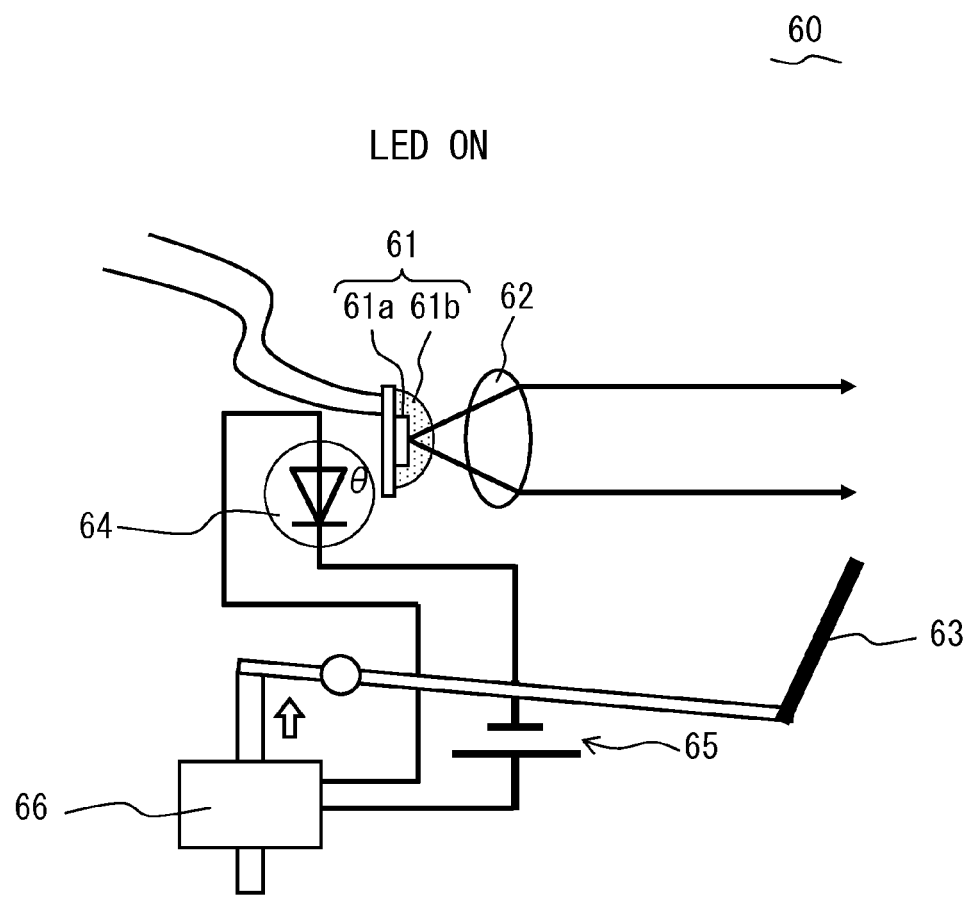
FIG. 7B illustrates the configuration of the light source unit that includes the light emitting element and the fluorescent substance in accordance with embodiment 4 and illustrates a state which is achieved during a light-on period of the light emitting element.

FIG. 7A illustrates a configuration of a light source unit that includes a light emitting element and a fluorescent substance in accordance with the present embodiment and illustrates a state which is achieved during a light-off period of the light emitting element. FIG. 7B illustrates the configuration of the light source unit that includes the light emitting element and the fluorescent substance in accordance with the present embodiment and illustrates a state which is achieved during a light-on period of the light emitting element. Except for the fact that the microscope in accordance with the present embodiment includes a light source unit 60 illustrated in FIG. 7A and FIG. 7B instead of the light source unit 10, the microscope in accordance with the present embodiment is similar to the microscope 1 illustrated in FIG. 1A and FIG. 1B. Accordingly, descriptions will not be given in detail.

The light source unit 60 illustrated in FIG. 7A and FIG. 7B is a microscope light source unit, and the light source unit 60 includes: a light source 61 that includes a solid light-emitting element 61a which emits excitation light and a fluorescent substance 61b which emits fluorescence upon irradiation with the excitation light; a collector lens 62 that converts, into substantially parallel light, mixed light which is a mixture of excitation light and fluorescence emitted from the light source 61; a shading member 63 that is an incidence limiting section to limit incidence of light on the light source 61 from an outside of the light source unit 60; a temperature detection diode 64 that includes resistance which varies in accordance with temperature; a power supply 65 that supplies electric power to an actuator 66; and a solenoid actuator 66 that converts electric power into mechanical drive.

While the solid light-emitting element 61a is in the light-on state, the temperature of the temperature detection diode 64 becomes high because of conduction of heat of the solid light-emitting element 61a, thereby decreasing the resistance, with the result that electricity flows through the temperature detection diode 64; while the solid light-emitting element 61a is in the light-off state, the resistance of the temperature detection diode 64 increases, so electricity does not flow through the temperature detection diode 64. Using such a characteristic, the temperature detection diode 64 functions as a switch that switches the state between the ON state and the OFF state in accordance with the state of the solid light-emitting element 61a.

Although not illustrated, the light source unit 60 further includes a switch that corresponds to the button switch 24 of the light source unit 20 in accordance with embodiment 1 and that switches the state of the solid light-emitting element 61a between the light-on state and the light-off state.

When the switch (not illustrated) is put in an ON state, the solid light-emitting element 61a is put in the light-on state and emits excitation light, which excites and causes the fluorescent substance 61b to emit fluorescence. As a result, mixed light which is a mixture of excitation light and fluorescence is emitted from the light source 61. At the same time, the resistance of the temperature detection diode 64 to which heat has been conducted from the light source 61 is decreased, causing the power supply 65 to supply electric power to the actuator 66, with the result that, through mechanical driving of the actuator 66, the shading member 63 is located at a position that deviates from an outgoing light path of the mixed light. That is, the shading member 63 is configured to remove an incidence limitation of light from outside while the solid light-emitting element 61a is being lit in conjunction with light emission of the solid light-emitting element 61a (in conjunction with a temperature increase caused by light emission, to be more exact).

When the switch (not illustrated) is put in the OFF state, the solid light-emitting element 61a is put in the light-off state. At the same time, the resistance of the temperature detection diode 64 increases, thereby stopping supply of electric power from the power supply 65 to the actuator 66. As a result, mechanical driving caused by a restoring force of, for example, a spring (not illustrated) included in the actuator 66 places the shading member 63 on the outgoing light path of mixed light. That is, the shading member 63 is configured to start an incidence limitation of light from outside while the solid light-emitting element 61a is in the light-off state.

Accordingly, as with the light source unit 10 and the microscope 1, without complicating the configuration of the microscope, the light source unit 60 and a microscope that includes the light source unit 60 enable incidence of unnecessary light on a light source that includes a solid light-emitting element and a fluorescent substance to be easily limited. As a result, generation of fluorescence from a fluorescent substance may be suppressed to avoid the influence of the fluorescence on a fluorescence image obtained in fluorescence observation.

FIG. 7A and FIG. 7B illustrate the temperature detection diode 64 that conducts electricity via the resistance being decreased upon a temperature increase and that stops a flow of electricity via the resistance being increased upon a temperature decrease, but the temperature detection diode is not particularly limited to one having such a characteristic. The temperature detection diode only needs to function as a switch that switches the state between the ON state and the OFF state in accordance with the state of the solid light-emitting element 61a (the light-on state and the light-off state); as an example, the temperature detection diode may stop a flow of electricity via the resistance being increased upon a temperature increase and may conduct electricity via the resistance being decreased upon a temperature decrease. As with the light source unit 20 in accordance with embodiment 1 and the microscope that includes the light source unit 20, the light source unit 60 in accordance with the present embodiment and the microscope that includes the light source unit 60 may be modified variously.

What is claimed is:

1. A microscope comprising:
a first epi-illumination light-source unit configured to perform fluorescence observation;
a second transmitted-illumination light-source unit configured to perform transmission observation, the second transmitted-illumination light-source unit including a light source provided with a light emitting element that emits excitation light and a fluorescent substance that emits fluorescence upon irradiation with the excitation light; and
an incidence limiting section configured to limit incidence of light on the light source from an outside of the second light source unit during a light-off period of the light emitting element,
wherein the incidence limiting section is configured to remove an incidence limitation of the light from the outside while the light emitting element is being lit.

2. The microscope according to claim 1, wherein the incidence limiting section is configured to start the incidence limitation of the light from the outside upon turning-off of the light emitting element.

3. The microscope according to claim 2, wherein the second light source unit includes a switch to switch a state of the light emitting element between a light-on state and a light-off state, and the incidence limiting section is configured to remove or start the incidence limitation of the light from the outside in conjunction with an operation of the switch.

4. The microscope according to claim 2, wherein the second light source unit includes a switch that switches a state between an ON state and an OFF state in accordance with a state of the light emitting element that includes a light-on state and a light-off state, and the incidence limiting section is configured to remove or start the incidence limitation of the light from the outside in conjunction with an operation of the switch.

5. The microscope according to claim 2, wherein the incidence limiting section is configured to remove the incidence limitation of the light from the outside in conjunction with energizing of the light emitting element.

6. The microscope according to claim 2, wherein the incidence limiting section is configured to remove the incidence limitation of the light from the outside in conjunction with light emission of the light emitting element.

7. The microscope according to claim 3, wherein the incidence limiting section is a shutter which is capable of being inserted in and withdrawn from an outgoing light path of mixed light that is a mixture of the excitation light and the fluorescence and which blocks the light from the outside, and the shutter is located on the outgoing light path during the light-off period of the light emitting element.

8. The microscope according to claim 3, wherein the incidence limiting section is a light path switching section that is located on an outgoing light path of mixed light that is a mixture of the excitation light and the fluorescence and that switches a light path of the light from the outside, and the light path switching section is configured to lead the light from the outside in a direction deviating from the light source during the light-off period of the light emitting element.

9. A microscope light source unit comprising:
a light source provided with a light emitting element that emits excitation light and a fluorescent substance that emits fluorescence upon irradiation with the excitation light; and
an incidence limiting section configured to limit an incidence of light on the light source from an outside during a light-off period of the light emitting element,
wherein the incidence limiting section is configured to remove an incidence limitation of the light from the outside while the light emitting element is being lit.

10. The microscope light source unit according to claim 9, wherein the incidence limiting section is configured to start the incidence limitation of the light from the outside upon turning-off of the light emitting element.

11. The microscope light source unit according to claim 10, further comprising a switch configured to switch a state of the light emitting element between a light-on state and a light-off state,
wherein the incidence limiting section is configured to remove or start the incidence limitation of the light from the outside in conjunction with an operation of the switch.

12. The microscope light source unit according to claim 10, further comprising a switch configured to switch a state between an ON state and an OFF state in accordance with a state of the light emitting element that includes a light-on state and a light-off state,
wherein the incidence limiting section is configured to remove or start the incidence limitation of the light from the outside in conjunction with an operation of the switch.

13. The microscope light source unit according to claim 10, wherein the incidence limiting section is configured to remove the incidence limitation of the light from the outside in conjunction with energizing of the light emitting element.

14. The microscope light source unit according to claim 10, wherein the incidence limiting section is configured to remove the incidence limitation of the light from the outside in conjunction with light emission of the light emitting element.

15. The microscope light source unit according to claim 11, wherein the incidence limiting section is a shutter which is capable of being inserted in and withdrawn from the outgoing light path of mixed light that is a mixture of the excitation light and the fluorescence and which blocks the light from the outside, and the shutter is located on the outgoing light path during the light-off period of the light emitting element.

16. The microscope light source unit according to claim 11, wherein the incidence limiting section is a light path switching section that is located on an outgoing light path of mixed light that is a mixture of the excitation light and the fluorescence and that switches a light path of the light from the outside, and the light path switching section is configured to lead the light from the outside in a direction deviating from the light source during the light-off period of the light emitting element.

\* \* \* \* \*